United States Patent
Bergeron

(10) Patent No.: US 9,479,417 B2
(45) Date of Patent: Oct. 25, 2016

(54) DUAL BANK TRAFFIC GENERATOR

(71) Applicant: Ixia, Calabasas, CA (US)

(72) Inventor: Matthew R. Bergeron, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 364 days.

(21) Appl. No.: 13/965,695

(22) Filed: Aug. 13, 2013

(65) Prior Publication Data

US 2015/0049772 A1 Feb. 19, 2015

(51) Int. Cl.
*H04J 3/24* (2006.01)
*H04L 12/26* (2006.01)
*H04L 12/24* (2006.01)

(52) U.S. Cl.
CPC ............. *H04L 43/50* (2013.01); *H04L 41/145* (2013.01); *H04L 43/026* (2013.01)

(58) Field of Classification Search
None
See application file for complete search history.

(56) References Cited

U.S. PATENT DOCUMENTS

| | | | |
|---|---|---|---|
| 7,042,892 B2 * | 5/2006 | Young | H04L 12/64 370/366 |
| 8,861,304 B1 * | 10/2014 | Cope | 365/233.1 |
| 2004/0156261 A1 * | 8/2004 | Becker | 365/233 |
| 2005/0265102 A1 * | 12/2005 | Remaklus et al. | 365/222 |
| 2011/0075503 A1 * | 3/2011 | Kwack et al. | 365/230.03 |
| 2011/0149673 A1 * | 6/2011 | Sim | 365/230.03 |
| 2012/0051234 A1 * | 3/2012 | Gintis | H04L 12/2697 370/250 |

* cited by examiner

*Primary Examiner* — Kibrom T Hailu
(74) *Attorney, Agent, or Firm* — SoCal IP Law Group LLP; John E. Gunther; Steve C. Sereboff

(57) ABSTRACT

There are disclosed traffic generators, methods, and computer readable media to generate packets for testing a network under test. A first parameter memory bank may be active when a first bank select data has a first value and inactive when the first bank select data has a second value. A second parameter memory bank may be inactive when the first bank select data has the first value and active when the first bank select data has the second value. One or more engines may generate packets based on parameters stored in the active one of the first and second parameter memory banks. A processor coupled to the first and second parameter memory banks may write parameter data into the inactive one of the first and second parameter memory banks.

30 Claims, 8 Drawing Sheets

DUAL BANK TRAFFIC GENERATOR

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, and 3 of the structure are the physical layer, the data link layer, and the network layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as WiFi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols.

In this patent, the term "network under test" (NUT) encompasses all or a portion of a packet switched communications network or one or more network devices within, or for use in, a packet switched communications network. In order to test a NUT, test traffic comprising a large number of packets may be generated and transmitted to and/or through the NUT at one or more ports. Return test traffic transmitted through and/or from the NUT may be received at different ports. The received test traffic may be analyzed to measure the performance of the NUT. In this context, the term "port" refers to a logical entity coupled to the NUT by a communications path. The term "port unit" refers to a module within the network test equipment that connects to the NUT at a port. Thus a "port" encompasses a physical "port unit" and the data and parameters that define and constraint the operation of the port unit during attest session. Each port connected to the NUT may be both a source of test traffic and a destination for test traffic. Each port may emulate a plurality of logical source or destination addresses. Each port may emulate a plurality of network users, clients, peers, servers, or other network devices.

A series of packets originating from a single source and having a specific type of packet and a specific rate will be referred to herein as a "stream." A source may be, for example, a port unit. A source may support multiple outgoing streams simultaneously and concurrently, for example to accommodate multiple packet types, rates, or destinations. "Simultaneously" means "at exactly the same time." "Concurrently" means "within the same time."

For the purpose of reporting network traffic data, the packets within a stream may be organized into flows, where a "flow" is any plurality of packets for which network traffic statistics are accumulated and reported. The packets in a given flow may be distinguished by a flow identifier contained in each packet. The flow identifier may be, for example, a dedicated identifier field, an address, a port number, a tag, or some other field or combination of fields within each data unit.

A plurality of concurrent streams may be combined to form the output from a traffic generator, which will be referred to herein as "test traffic". The streams within the test traffic may be combined through interleaving. The interleaving may be balanced, unbalanced, and distributed among the represented streams. The composition of the test traffic may depend on the type of network or device to be tested and the type of test to be performed. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant.

When the NUT operates at a higher layer of the network structure (for example, when the NUT is or includes a server, a server load balancer, a firewall, a network security device that performs packet inspection, or similar network devices), the test traffic may include or be a large plurality of TCP connections or a large plurality of application layer transactions (e.g. HTTP GET transactions).

Throughout this description, elements appearing in figure are assigned three-digit reference designators, where the two least significant digits are specific to the element and the most significant digit is the figure number where the element is introduced. An element that is not described in conjunction with a figure may be presumed to have the same characteristics and function as a previously-described element having the same reference designator.

DETAILED DESCRIPTION

Description of Apparatus

Figure 1:
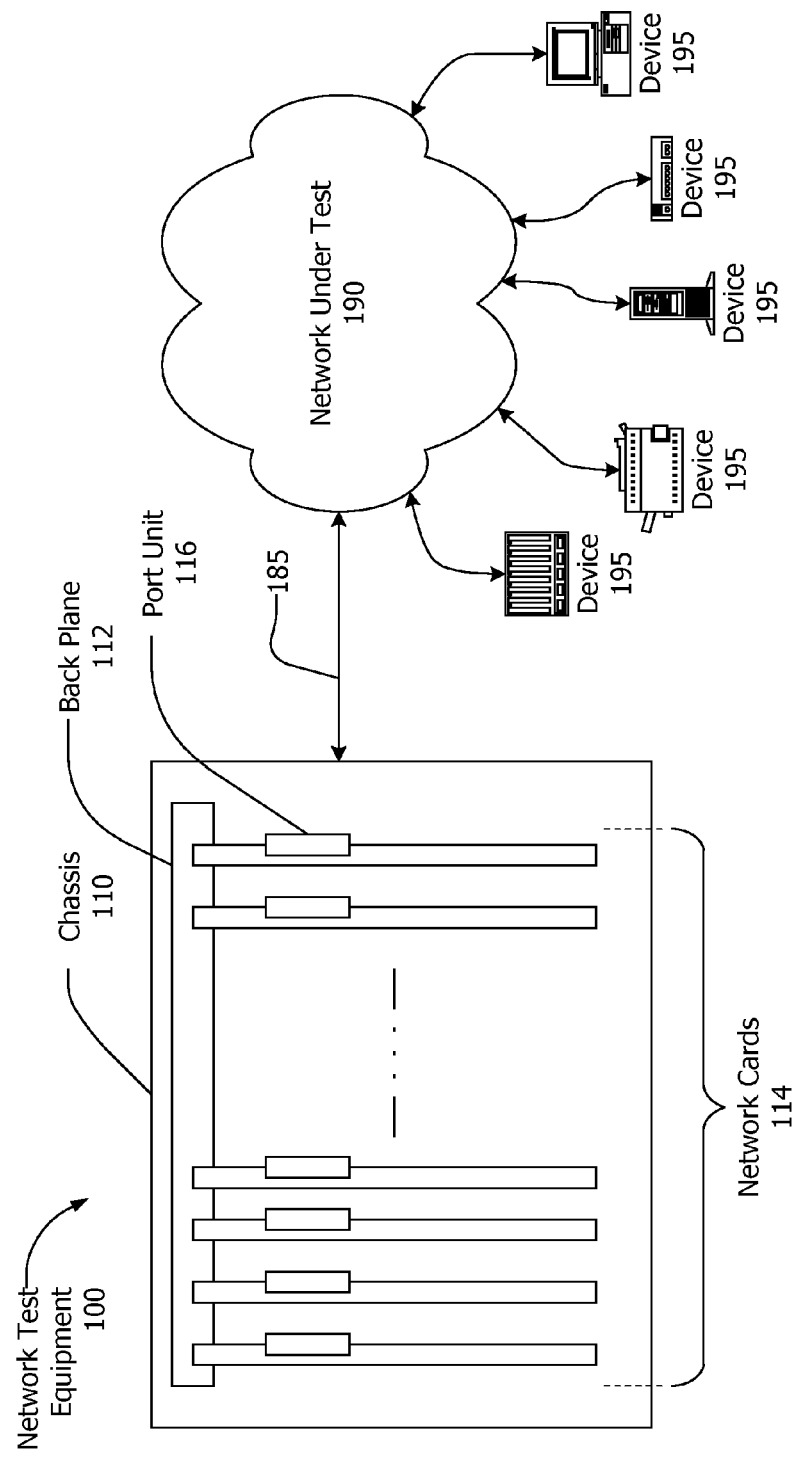
FIG. 1 is a block diagram of a network environment.

FIG. 1 shows a block diagram of a network environment. The environment may include network test equipment 100, a network 190 and plural network devices 195.

The network test equipment 100 may be a network testing device, performance analyzer, conformance validation system, network analyzer, or network management system. The network test equipment 100 may include one or more network cards 114 and a backplane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet, Sonet, and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may contain one or more port unit 116. Each port unit 116 may connect to the network 190 through one or more ports. The ports may be connected to the network through a communication medium 185, which may be a wire, an optical fiber, a wireless link, or other communication medium. Each network card 114 may support a single communications protocol, may support a number of related protocols, or may support a number of unrelated protocols. The network cards 114 may be permanently installed in the network test equipment 100 or may be removable.

The backplane 112 may serve as a bus or communications medium for the network cards 114. The backplane 112 may also provide power to the network cards 114.

The network devices 195 may be any devices capable of communicating over the network 190. The network devices 195 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 195 may include industrial machines, household appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 195 may communicate simultaneously with one another, and there may be plural logical communications paths between the network test equipment 100 and a given network device 195. The network itself may be comprised of numerous nodes providing numerous physical and/or logical paths for data to travel.

Figure 2:
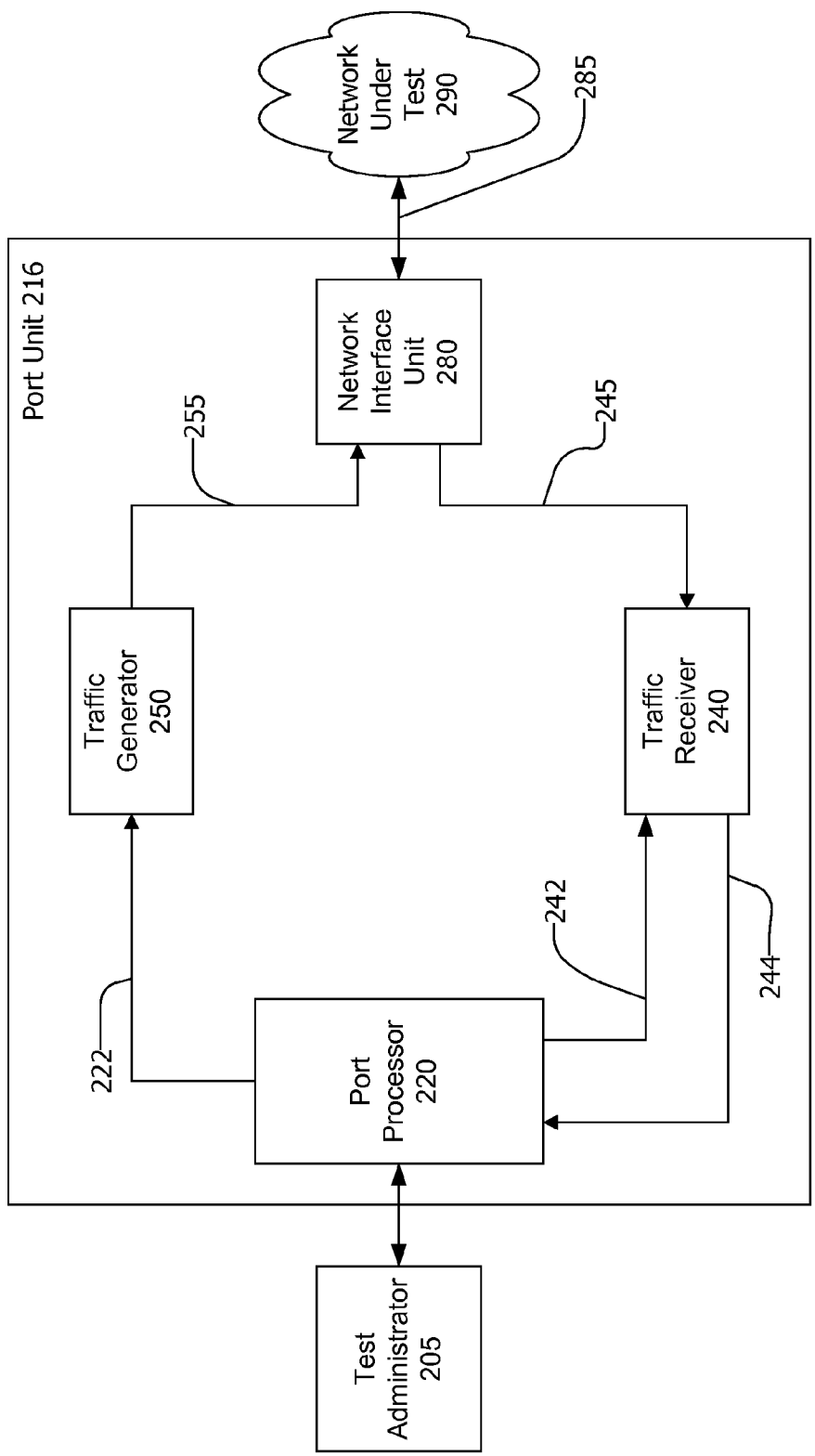
FIG. 2 is a block diagram of a test system.

Referring now to FIG. 2, an exemplary port unit 216 may include a port processor 220, a traffic generator 250, a traffic receiver 240, and a network interface unit 280 which couples the port unit 216 to a network under test 290. The port unit 216 may be all or part of a network card such as the network cards 114.

The port processor 220 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 220 may communicate with a test administrator 205. The test administrator 205 may be a computing device contained within, or external to, the network test equipment 100. The test administrator 205 may provide the port processor with instructions and data required for the port unit to participate in testing the network under test 290. The instructions and data received from the test administrator 205 may include, for example, definitions of packet streams to be generated by the port unit 216 and definitions of performance statistics that may be accumulated and reported by the port unit 216.

The port processor 220 may provide the traffic generator 250 with stream forming data 222 to form a plurality of streams that may be interleaved to form the outgoing test traffic 255. The stream forming data 222 may include, for example, the type of packet, the frequency of transmission, definitions of fixed and variable-content fields within the packet and other information for each packet stream. The traffic generator 250 may then generate the plurality of streams in accordance with the stream forming data 222. Each of the streams may include a sequence of packets. The packets within each stream may be of the same general type but may vary in length and content.

The network interface unit 280 may convert outgoing test traffic 255 from the traffic generator 250 into the electrical, optical, or wireless signal format required to transmit the test traffic to the network under test 290 via a link 285. The link 285 may be a wire, an optical fiber, a wireless link, or other communication link. Similarly, the network interface unit 280 may receive electrical, optical, or wireless signals from the network over the link 285 and may convert the received signals into incoming test traffic 245 in a format usable to the traffic receiver 240.

The traffic receiver 240 may receive the incoming test traffic 245 from the network interface unit 280. The traffic receiver 240 may determine if each received packet is a member of a specific flow, and may accumulate test statistics for each flow in accordance with test instructions 242 provided by the port processor 220. The accumulated test statistics may include, for example, a total number of received packets, a number of packets received out-of-sequence, a number of received packets with errors, a maximum, average, and minimum propagation delay, and other statistics for each flow. The traffic receiver 240 may also capture and store specific packets in accordance with capture criteria included in the test instructions 242. The traffic receiver 240 may provide test statistics and/or captured packets 244 to the port processor 220, in accordance with the test instructions 242, for additional analysis during, or subsequent to, the test session.

Figure 3:
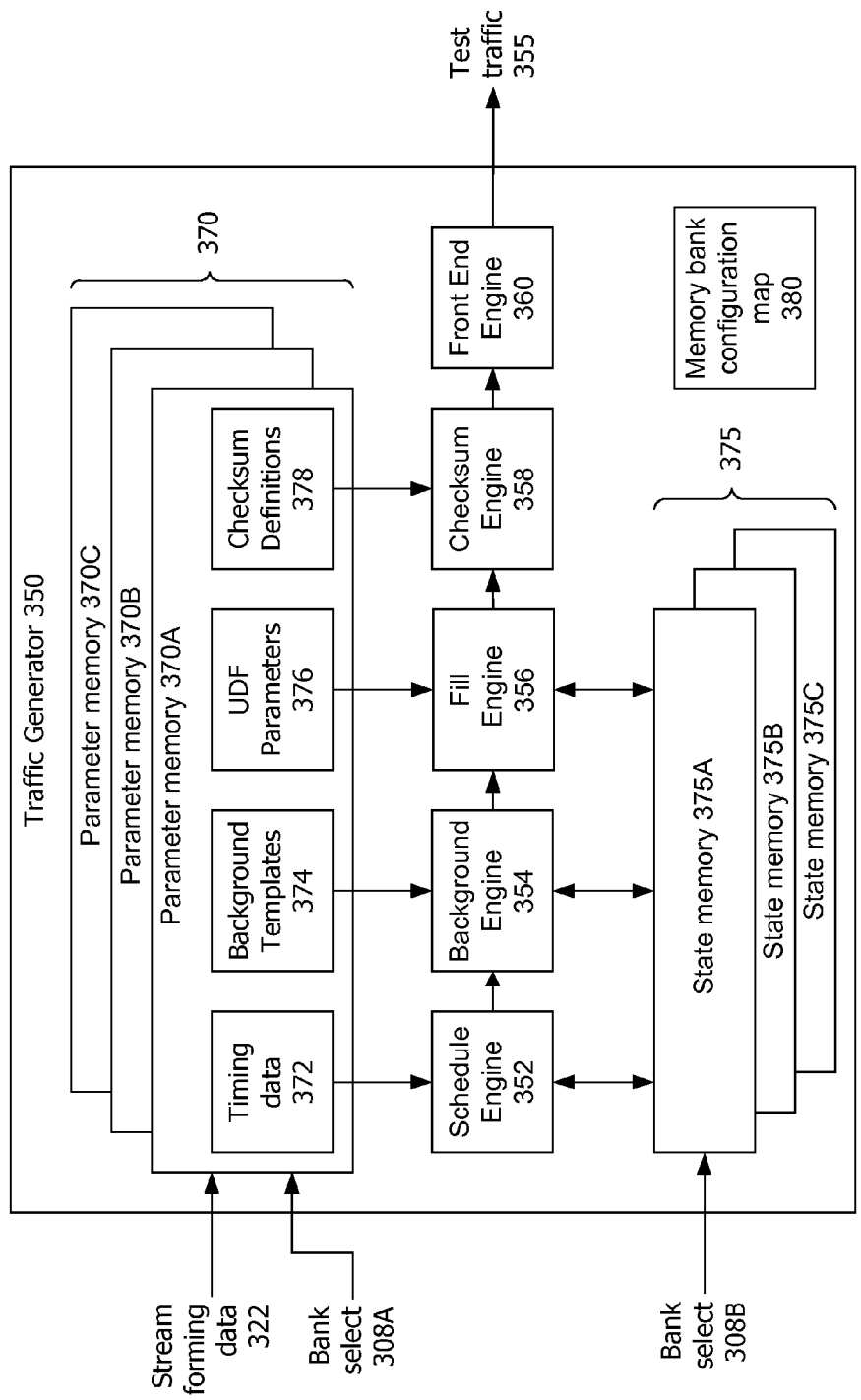
FIG. 3 is a block diagram of a traffic generator.

Referring now to FIG. 3, an exemplary traffic generator 350 may generate test traffic 355 composed of one or more interleaved streams of packets. The exemplary traffic generator 350 may be the traffic generator 250 of FIG. 2 and may be all or a portion of a network card 114 as shown in FIG. 1. The traffic generator 350 may include a schedule engine 352, a background engine 354, a fill engine 356, a checksum engine 358, and a front end engine 360. The traffic generator 350 may include a parameter memory 370 that may be partitioned into a first bank 370A, a second bank 370B, and optionally a third bank 370C. The traffic generator 350 may also include a state memory 375 that may be partitioned into a first bank 375A, a second bank 375B, and optionally a third bank 375C.

Within this description, the term "engine" means a collection of hardware, which may be augmented by firmware and/or software, that performs the described functions. An engine may be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable semiconductor device such as a field programmable gate array (FPGA), a programmable logic device (PLD), or a programmable logic array (PLA). The gate netlist or other physical description may be converted into process instructions and masks for fabricating the engine within an application specific integrated circuit (ASIC). An engine may include a processor and the functions of the engine may be implemented, wholly or in part, by the processor executing software instructions.

The physical partitioning of the components of the traffic generator 350 may be different from the functional partitioning shown in FIG. 3, such that a given functional component or block or memory bank may be divided between two or more circuit devices and a single circuit device may contain all or portions of two or more functional components or all functional components.

Programming code for implementing all or portions of the traffic generator 350 in a programmable semiconductor device may be stored on a computer readable storage medium. In this patent, a "computer readable storage medium" is a physical device, such as an optical disc or flash memory, for storing data. The term "computer readable storage medium" does not encompass transitory media such as signals and waveforms.

The schedule engine 352, the background engine 354, the fill engine 356, the checksum engine 358, and the front end engine 360 may perform their respective functions sequentially or concurrently or some combination of sequentially and concurrently. The schedule engine 352, the background engine 354, the fill engine 356, the checksum engine 358, and the front end engine 360 may be, at least in part, a pipeline such that multiple packets may be processed simultaneously in different portions of the traffic generator 350

The parameter memory 370 may store stream forming data 322 received from a port processor such as the port processor 220 or from another computing device (not shown) which may direct and monitor network tests. The stored stream forming data 322 may define a plurality of streams that, in combination, form test traffic 355. For example, packets from the plurality of streams may be interleaved to form the test traffic 355. The parameter memory 370 may store, for each stream, timing data 372 required for the stream scheduler to schedule the packets comprising each stream at the appropriate time intervals. The parameter memory 370 may store one or more background templates 374 for each stream. Each background template 374 may define the general structure of each packet in the corresponding stream and contain the fixed content of each packet.

When the background table includes a plurality of background templates 374 for a given stream, the templates may be used in sequence or in a defined order. The parameter memory 370 may also include, for each stream, data defining variable-content fields within each packet, data or instructions for setting the length of each packet, and data or instructions for filling the payload of each packet. Variable-content fields within each packet may include user defined fields (UDFs) defined by UDF parameter 376, and checksum fields defined by checksum definitions 378. The parameter memory may include parameters for use by the front end engine 360, such as, for example, data defining where a timestamp should be placed within some or all packets. The parameter memory 370 may also include other data and instructions.

The parameter memory 370 may be dynamic random access memory (DRAM) or static random access memory (SRAM). The parameter memory 370 may be implemented within an ASIC, FPGA or other circuit device containing all or other portions of the traffic generator 350. The parameter memory 370 may be distributed within a circuit device or distributed between multiple circuit devices. The parameter memory 370 may be implemented wholly or partially with DRAM or SRAM memory chips external to the ASIC, FPGA or other circuit devices.

The parameter memory 370 may be structured such that one of the first bank 370A and the second bank 370B is "active" and the other bank is "inactive". The third bank 370C, when present, may always be active. Each active bank may be accessed by the various engines 352-358 to generate the test traffic 355. The inactive bank may not be accessed by the traffic generator engines, but may be read from and written into by a computing device (not shown in FIG. 3) such as the port processor 220. Which of the first bank 370A and the second bank 370B is active may be determined by first bank select data 308A. The bank select data 308A may be provided to the traffic generator 350 by, for example, a test administrator, not shown in FIG. 3, such as the test administrator 205. For example, the first parameter memory bank 370A may be active when the first bank select data 308A has a first value and inactive when the first bank select data 308A has a second value. Conversely, the second parameter memory bank 370B may be inactive when the first bank select data 308A has the first value and active when the first bank select data 308A has the second value. The first bank select data 308A may be a flag or binary bit having logic states "0" or "1" (either of which may be the "first value" or "the second value"). The first bank select data 308A may be a digital signal having a voltage or other signal level having one of two possible values or value ranges.

When the schedule engine 352 determines that a packet should be generated for a specific stream, the background engine 354 may retrieve the appropriate background template 374 from the active bank of the parameter memory 370. The background engine 354 may expand or truncate the payload portion of the background template 374 to achieve an overall packet length determined by the schedule engine 352 or the background engine 354.

The fill engine 356 may then fill or overlay variable-content field data onto the packet template based on UDF parameters 376 retrieved from the active back of the parameter memory 370. The UDF parameters 376 may include a position of each UDF within the packet. UDF position may be defined, for example, as an offset from the start of the packet. The UDF parameters 376 may further include a type for each UDF and additional data required to generate the content of the UDFs in the packet being generated. For example, one type of UDF may be a counter field defined by an initial value, an increment value, and a maximum value. For further example, another type of UDF may be a table field that is filled with a value selected from a table of values that are used in rotation. The fill engine 356 may fill the payload portion of the packets.

After the fill engine 356 has inserted the content of the payload and the content of the UDFs into the background template, the checksum engine 358 may calculate one or more checksums in accordance with checksum definitions 378 retrieved from the active bank of the parameter memory 370. The checksum definitions 378 may include information defining how a checksum is calculated as well as information defining where the calculated checksum should be placed within the packet. The checksum engine 358 may insert the one or more calculated checksums into the background template. The front end engine 360 may add a cyclic redundancy check value and/or a timestamp to each packet as the test traffic 355 is sent to a network interface unit, such as the network interface unit 280, for transmission to the network under test 290.

The operation of the schedule engine 352, the background engine 354, and the fill engine 356 may be stateful, which is to say the action of these engines at any given point in time may depend upon actions occurring at preceding points in time. For example, a possible technique to implement the schedule engine is to provide a count-down timer for each of a plurality of streams to be generated by the traffic generator 350. Each count-down timer may include a counter that is initially set to a respective predetermined value. Each counter may then count downward on successive cycles of a clock. When a counter value reaches zero, a packet for the corresponding stream may be initiated and, on the next clock cycle, the counter may be preset to the predetermined value to repeat the cycle. The counter value at any given time represents the "state" of the count-down timer, and the values of the down counters for all of the streams collectively form the state of the schedule engine. Values that represent the state of some portion of the traffic generator will be collectively referred to herein as "state variables". The predetermined values associated with the count-down timers are parameters that determine the data rate (i.e. how often packets are generated) of the corresponding streams. The predetermined values for each count-down timer may be stored as timing data 372 in the parameter memory 370 and the instantaneous values of the counters may be stored in the state memory 375.

For further example, the background engine 354 may store one or more state variables indicating which of a plurality of templates should be used next for some or all of the plurality of streams. Similarly, the fill engine 356 may fill fields of packets with values retrieved from look-up tables and store state variables indicating which table entry should be used for the next packet.

The state memory 375 may be structured such that one of the first bank 375A and the second bank 375B is "active" and the other bank is "inactive". The third bank 375C, when present, may always be active. Each active bank may be accessed by the various engines 352-358 to generate the test traffic 355. The inactive bank may not be accessed by the traffic generator engines, but may be read from and written into by a computing device (not shown in FIG. 3) such as the port processor 220. Which of the first bank 375A and the second bank 375B is active may be determined by second bank select data 308B, which may be the same or different from the first bank select data 308A. For example, the first state memory bank 357A may be active when the second bank select data has a first value and inactive when the second bank select data 308B has a second value. Conversely, the second state memory bank 375B may be inactive when the second bank select data 308B has the first value and active when the second bank select data has the second value. The second bank select data 308B may be a flag or binary bit having logic states "0" or "1" (either of which may be the "first value" or "the second value"). The second bank select data 308B may be a digital signal having a voltage or other signal level having one of two possible values or value ranges.

Providing alternately active and inactive banks 370A and 370B for the parameter memory 370 and alternately active and inactive banks 375A and 375B for the state memory 375 allows changes to some or all of the packet streams being generated while a test session is underway without interrupting the test traffic 355. For example, while the traffic generator 350 continues to generate traffic using the active parameter and state memory banks, different stream forming data may be written into the inactive memory banks. The content of the active parameter memory 370A or 370B is not changed by the traffic generator 350 in the course of generating the test traffic 355. Thus stream forming data previously written into the active parameter memory bank may be duplicated in the inactive memory bank except for one or more revised parameter values. Once the revised stream forming data is stored in the inactive memory bank, the rolls of the two parameter memory banks may be reversed using the first bank select data 308A. In this manner, one or more parameter values may be revised without disturbing other parameter values or interrupting the operation of the traffic generator 350. The same first bank select data 308A may be provided to all port units in a test configuration to allow minor or substantial changes in traffic generation to be synchronized across the entire test configuration.

The content of the active state memory 375A or 375B changes continuously (i.e. every clock cycle) as the traffic generator 350 generates the test traffic 355. Thus the state variables stored in the active state memory bank cannot be duplicated in the inactive state bank, (data read from the active state memory bank may be obsolete one clock cycle later). Switching between the active and inactive state memory banks is likely to change most or all of the state variable values, and is essentially equivalent to starting a new test session. Switching between the active and inactive state memory banks is likely to be synchronized with switching the parameter memory banks 370A and 370B. The same bank second data 308B may be provided to all port units in a test configuration to allow the start of a new test session to be synchronized across the entire test configuration.

A parameter memory may be divided into banks in many ways. For example, assuming the parameter memory 370 is divided into slots to store parameters for sixteen streams, the first and second parameter memory banks 370A may each store parameters for eight streams which can be modified during a test session. In this case, the third parameter memory back 370C will not exist. Alternatively, the first and second parameter memory banks 370A may each store parameters for four streams which can be modified during a test session and the third parameters memory bank 370C may store parameters for eight additional streams. A parameter memory 370 may have slots to store parameters for more or fewer than sixteen streams. The first and second parameter memory banks 370A and 370B may each store parameters for as few as zero streams (in which case only memory bank C exists) or as many as one-half of the capacity of the parameter memory 370 (in which case memory bank C does not exist). In any case, the state memory 375 would be configured similarly to the parameter memory 370.

The partition of the parameter memory 370 and the state memory 375 into banks may be fixed. The partition of the parameter memory 370 and the state memory 375 into banks may be reconfigurable and set before the start of a test session. The partition of the parameter memory 370 and the state memory 375 into banks may be dynamic and changeable during a test session. When the partition of the parameter memory 370 and the state memory 375 into banks is configurable or dynamic, a memory bank configuration map 380 may store information indicating how the parameter memory 370 and the state memory 375 are partitioned. Continuing the examples from the previous paragraph, the memory bank configuration map 380 may store data indicating that bank A includes memory slots 1-8 and bank B includes memory slots 9-16. Alternatively, the memory bank configuration map 380 may store data indicating that bank A includes memory slots 1-4 and bank B includes memory slots 5-8, and bank C includes memory slots 9-16.

Each memory bank need not consist of contiguous memory slots. For example, memory bank A may include memory slots 1 and 3, and memory bank B may include memory slots 4 and 11. In this case, the memory bank configuration map 380 may store data indicating that slot 1 and slot 4 are counterparts to be used alternately and that slot 3 and slot 11 are counterparts to be used alternately.

Figure 4:
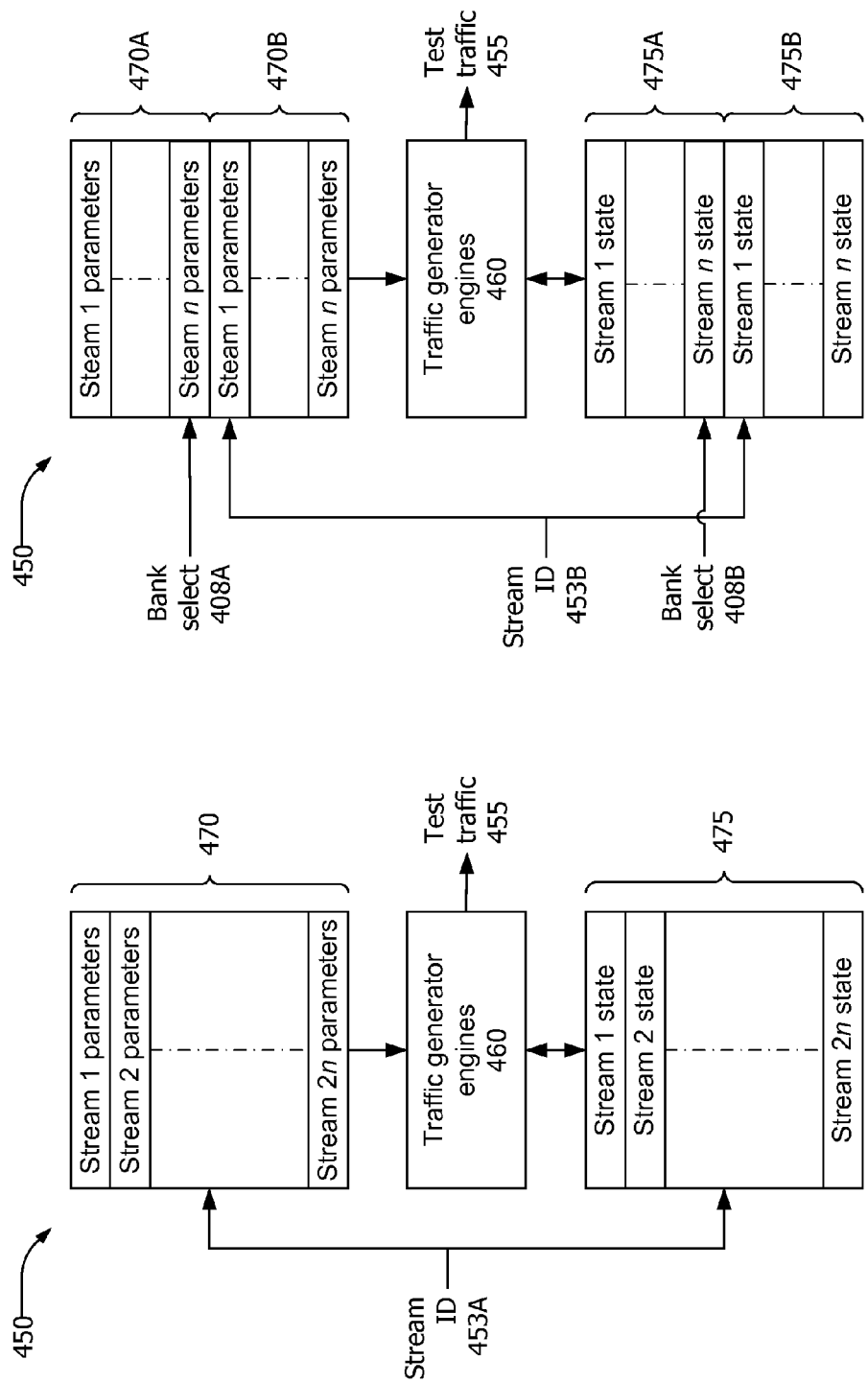
FIG. 4A is a block diagram of a traffic generator.
FIG. 4B is a block diagram of a traffic generator.

FIG. 4A and FIG. 4B are block diagrams of two configurations of a traffic generator 450 which may be the traffic generator 350. The traffic generator 450 includes multiple engines 460 (such as the background engine 354, the fill engine 356, the checksum engine 358, and the front end engine 360 of FIG. 3) which generate test traffic 455. To generate the test traffic 455, the engines 460 access parameters stored in a parameter memory 470 and store state variables in a state memory 475.

In the configuration of FIG. 4A, the parameter memory 370 has memory slots to store parameters for 2n streams, identified as "Stream 1" to "Stream 2n". Similarly, the state memory 375 has memory slots to store state variable for the 2n streams. The appropriate parameters and state variables are selected based on a stream ID 453A which is provided for each packet to be generated by a scheduler such as the schedule engine 352. For example, if the traffic generator 450 generates 32 streams (i.e. n=16), the stream ID 453A may be a five-bit binary number associating each packet being generated to a respective stream.

In the configuration of FIG. 4B, the parameter memory 370 is partitioned into two banks 370A, 370B, each of which has memory slots to store parameters for n streams, identified as "Stream 1" to "Stream n". Similarly, the state memory is partitioned into two banks 375A, 375B, each of which has memory slots to store state variables for the n streams. The appropriate parameters and state variables are selected based on a stream ID 453B which is provided for each packet to be generated by a scheduler such as the schedule engine 352. Continuing the previous example, the stream ID 453B may be a four-bit binary number associating each packet being generated to a respective stream. The active bank 370A or 370B of the parameter memory may be selected by a first bank select data 408A and the active bank 375A or 375B of the state memory may be selected by a second bank select data 408B. It can be seen that the configuration shown in FIG. 4A and the configuration shown in FIG. 4B are identical except that one bit (e.g. the most significant bit) of the stream ID 453A in FIG. 4A is redefined as the bank select data 408A, 408B in FIG. 4B. Thus the same traffic generator hardware may selectively implement either the configuration of FIG. 4A or the configuration of FIG. 4B.

Figure 5:
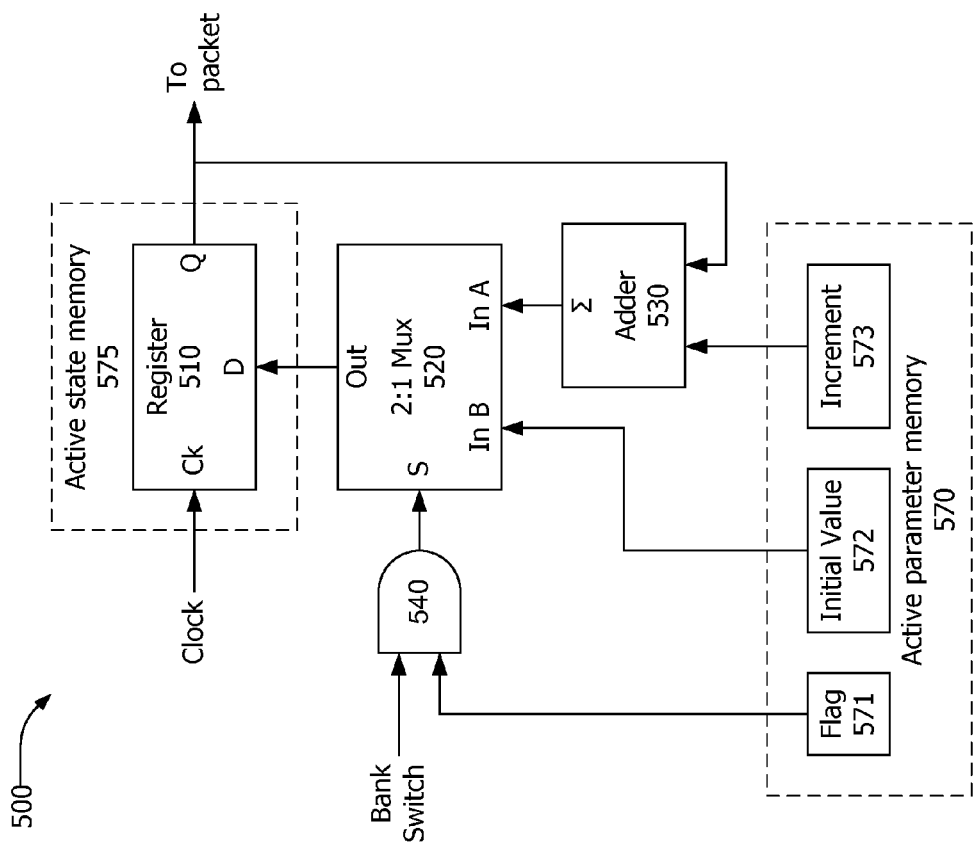
FIG. 5 is a block diagram of an exemplary state machine.

As previously described, switching banks of a state memory is useful to start a new test session, but cannot be used to change only a few state variables. However, it is possible to selectively reset state variables to predetermined values synchronously with switching banks of a parameter memory. FIG. 5 is a block diagram of a simple exemplary state machine 500 that can be selectively reset by a bank switch signal that is high for a single clock cycle concurrent with switching banks of the parameter memory.

The state machine 500 has a single state variable which is stored in a register 510 that is a portion of a state memory 575. The register 510 stores an input value D on each cycle of a clock and provides the stored value Q for inclusion in a packet as, for example, a sequence number, an address, or a port number. The value D is output from a multiplexer 520. During normal operation (with the Bank Switch signal low), the multiplexer 520 selects the output from an adder 530 that adds an increment 573 to the Q value from the register 510. Thus, in normal operation, the Q value increases each clock cycle by the increment 573. When both the bank switch signal and a flag 571 are high, the multiplexer 520 selects an initial value 572 instead of the output of the adder 530. In this case, the register 510 is reset to the initial value 572 on the next clock cycle, synchronously with switching banks of the parameter memory. The flag 571, the initial value 572, and the increment 573 may be parameters stored in the parameter memory. The value of the flag 571 determines whether the register 510 should be reset (i.e. flag="1") or not reset (flag="0").

The state machine shown in FIG. 5 is simplistic. Much more complex state machines, which may each involve one or more state variables, may be present within the engines of a traffic generator. A respective flag and/or a respective initial value may be stored in the parameter memory for some or all of the state variables.

As previously described, a traffic generator may be structured, in whole or in part, as a pipeline such that multiple packets may be processed simultaneously in different portions of the traffic generator. When a traffic generator includes a pipeline, the generation of packets may occur over an extended period of time (i.e. multiple or many clock cycles). Switching parameter memory banks and/or state memory banks during the generation of a packet may result in generation of a corrupted packet. It may be desirable that, once generation of a packet is started, the packet is completed using the same parameter and state memory banks.

Figure 6:
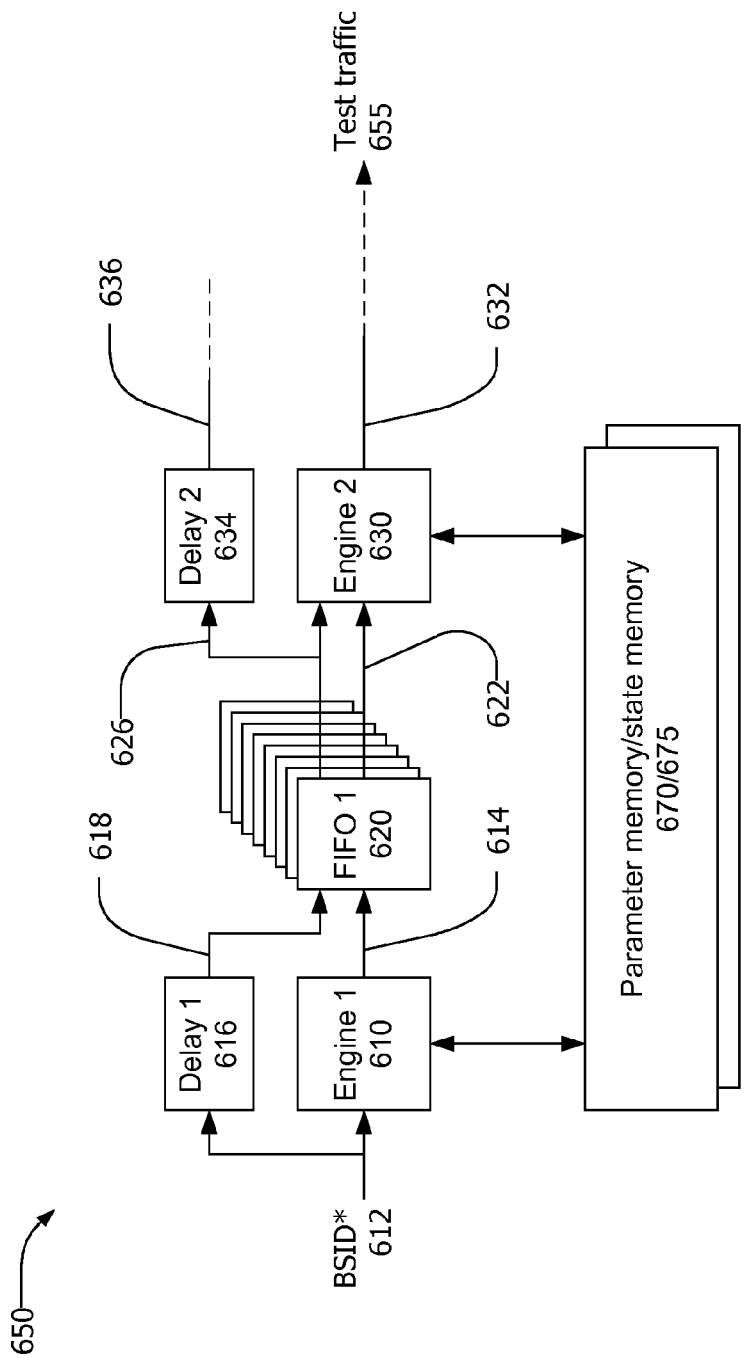
FIG. 6 is a block diagram of portions of a traffic generator.

FIG. 6 is a block diagram of a portion of a traffic generator 650 organized as a pipeline including a first engine 610, a second engine 630, a first FIFO (first-in, first-out) queues 620, a parameter memory 670, and a state memory 675. The first engine 610 and the second engine 630 may each be all or a portion of one of the engines 352, 354, 356, and/or 358 of the traffic generator 350 of FIG. 3. The parameter memory 670 and/or the state memory 675 may be partitioned into an active bank and an inactive bank as previously described.

The first engine 610 may receive initial bank select/identifier (BSID) information 612 from a previous stage of the traffic generator 650. The initial BSID information 612 may include some or all of parameter memory bank select data, state memory bank select data, a bank switch signal, and a stream identifier which may function as previously described. The first engine may read parameters from the active bank of parameter memory 670, and may read state variables from and write state variables to the active bank of the state memory 675 based in part on the stream identifier. The first engine 610 may select the active banks of the parameter memory 670 and state memory 675 based on the bank select data and the bank switch signal. The first engine 610 may output a first partially formed packet 614 that is stored in the first FIFO 620 and subsequently provided to the second engine 630 as a first delayed partially formed packet 622.

The second engine 630 may further process the first delayed partially formed packet 622 and may output a second partially formed packet 632. To this end, the second engine 630 may read parameters from the parameter memory 670, and may read state variables from and write state variables to the state memory 675. To ensure that the second engine 630 reads from and writes to the same memory banks as the first engine 610, the second engine 630 needs to receive BSID information that is in synchronism with the first delayed partially formed packet 622.

The initial BSID information 612 may be input to a first delay that outputs first delayed BSID information 618 delayed by a time period equal to the processing latency time of the first engine 610. The first delayed BSID information 618 may then be stored in the first FIFO 620 in association with the first partially formed packet 614. Second delayed BSID information 626 may be output from the firsts FIFO synchronously with the first delayed partially formed packet 622. The second delayed BSID information 626 may be input to the second engine 630 and to a second delay 634. The second delay 634 may output third delayed BSID information 636 synchronous with the second partially formed packet 632. The packet being formed and the BSID information may propagate synchronously through additional engines and FIFO stages until a fully formed packet is contributed to the test traffic 655.

Description of Processes

Figure 7:
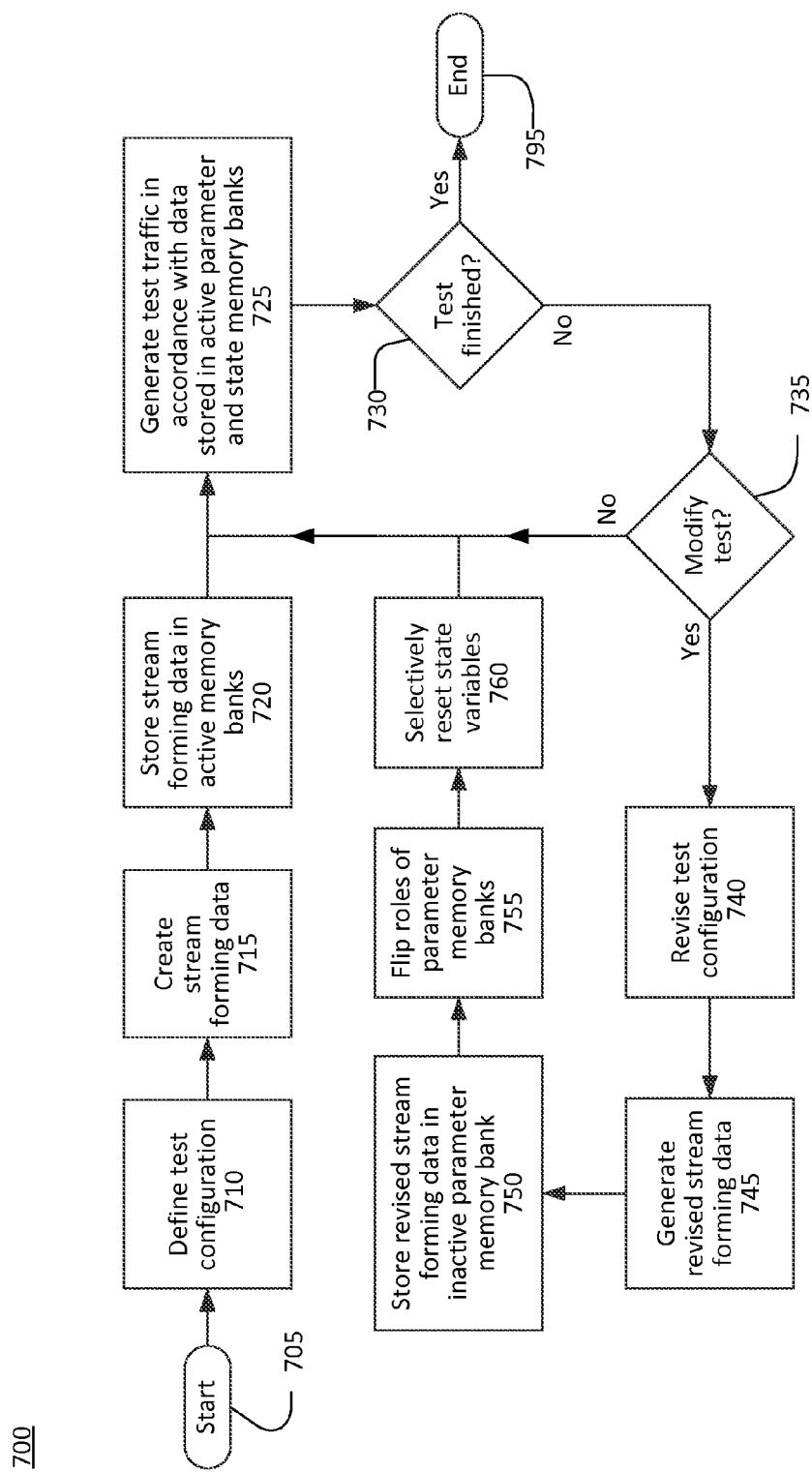
FIG. 7 is a flow diagram of a process for testing a network.

Referring now to FIG. 7, a process 700 for generating test traffic may start at 705 and may end at 795 after a large number of packets have been generated, or until stopped by an operator action (not shown). The process 700 may be appropriate for generating traffic using a traffic generator that includes a dual-bank parameter memory, such as the traffic generator 350.

At 710, a test configuration may be designed. In this patent, a "test configuration" is a data set that defines both a test system and a test procedure to be used to test a network under test (NUT). A test configuration may include, for example, data defining the number and types of port units that will be connected to the NUT, the attributes and capabilities of each port, the protocols to be executed by each port, the traffic to be generated by each port, and the test data to be acquired during the test. The test configuration design may be done, for example, by a test engineer or other user of a test administrator computing device, such as the test administrator 205, coupled to one or more port units, such as the port unit 216.

At 715, streams to be generated during the test session may be defined and the stream forming data necessary to generate the defined streams may be created. The stream forming data may include, for each stream, timing data, one or more background templates, UDF parameters, checksum definitions, and other data.

At 720, the stream forming data created at 715 may be sent to at least one port unit to commence the test session. Commonly, a test session may involve a plurality of port units. In this case, each of the plurality of port units may receive stream forming data for all streams or only for streams that originate at the port unit. At 720, the stream forming data may be stored, for example, in an active bank of a parameter memory with a traffic generator, such as the traffic generator 250, at each port unit. To facilitate subsequently making minor changes to the stream forming data, the stream forming data created at 715 may be stored in both active and inactive banks of the parameter memory at 720.

At 725, test traffic may be generated in accordance with the stream forming data stored in the active parameter memory bank at 720. As the test traffic is generated, state variables may be stored in the active state memory bank. At 730, a determination may be made whether or not the test session is finished. A determination may be made that the test session is finish based upon an elapsed period of time, transmission of a predetermined amount of test traffic, or some other criteria. A test session may also be terminated by an operator action (not shown). When a determination is made that the test session is finished, the process 700 may end at 795.

When a determination is made at 730 that the test session will continue, a further determination may be made at 735 whether or not the test session in progress will be modified. When the test session will not be modified, the process 700 may return to 725 to continue to generate test traffic. Although shown as sequential actions for ease of description, the actions at 725, 730, and 735 may be performed continuously and essentially in parallel such that test traffic is continuously generated until either the test session is finished or the test session is modified.

A determination that the test session will be modified may be made at 735 in response to a predetermined plan or schedule or in response to an operator request. When the test session is to be modified, a revised test configuration may be defined at 740 and revised stream forming data to implement the revised test configuration may be generated at 745.

After the revised stream forming data is stored in the inactive parameter memory at 750, the roles of the parameter memory banks may be switched at 755. One or more state variables may be selectively reset at 760 synchronous with switching the parameter memory banks at 755. After the switch, the previously inactive memory bank, which contains the revised stream forming data, becomes the active memory bank. The generation of test traffic then continues at 725 using the revised stream forming data.

Figure 8:
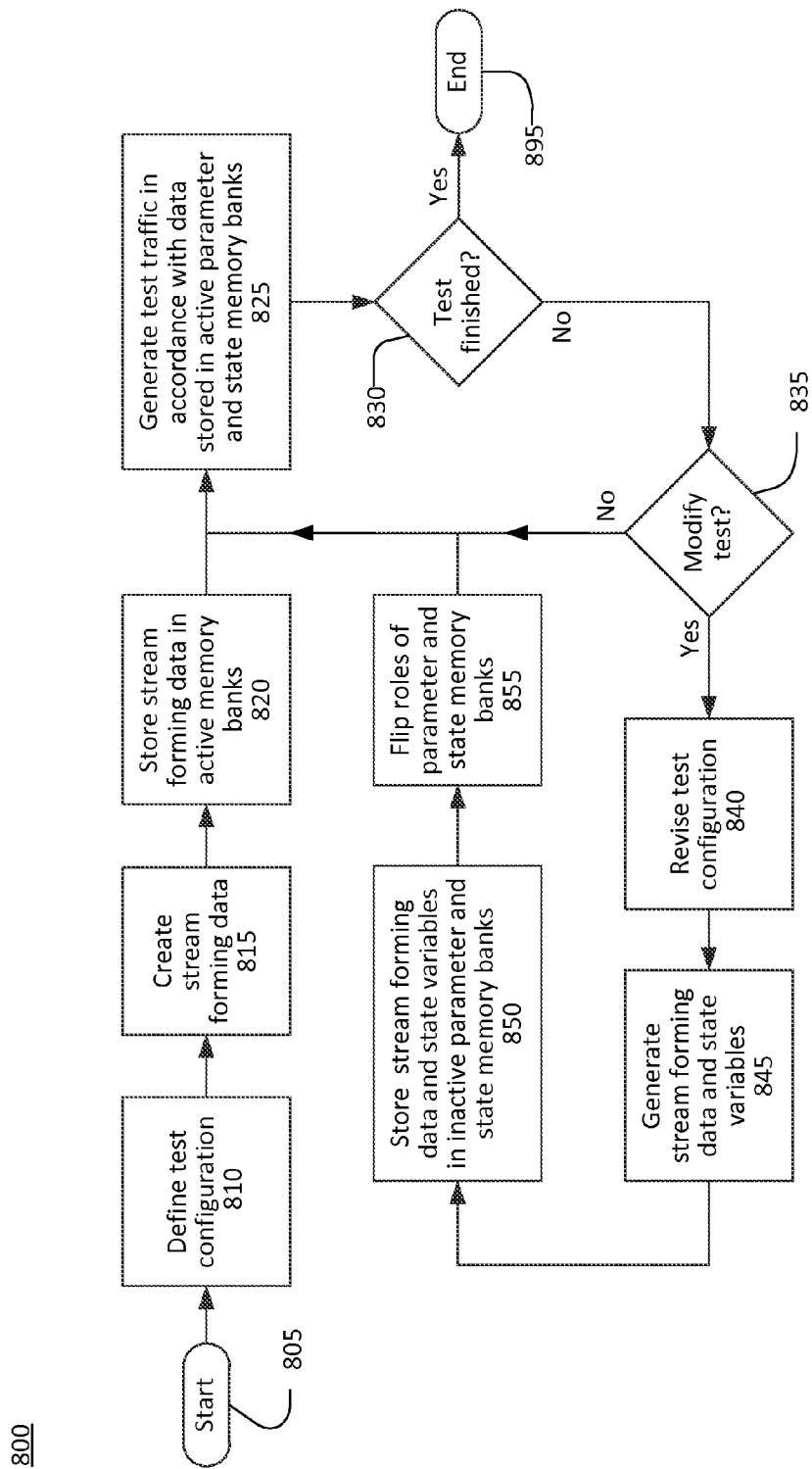
FIG. 8 is a flow diagram of another process for testing a network.

Referring now to FIG. 8, another process 800 for generating test traffic may start at 805 and may end at 895 after a large number of packets have been generated, or until stopped by an operator action (not shown). The process 800 may be appropriate for generating traffic using a traffic generator that includes a dual-bank parameter memory and a dual-bank state memory, such as the traffic generator 350. The process 800 is similar to the process 700 of FIG. 7. Actions 810-835 in the process 800 are essentially identical to the counterpart actions in the process 700. Descriptions of these actions will not be repeated.

When the test session is to be modified, a revised test configuration may be defined at 840 and stream forming data and initial state variables to implement the revised test configuration may be generated at 845. As previously discussed, substituting new state variables by switching state memory banks is effectively equivalent to starting a new test session. At 850, the revised stream forming data may be stored in the inactive parameter memory and the new state variables may be stored in the inactive state memory bank. The roles of the parameter memory banks and the state memory banks may be switched at 855. After the switch, the previously inactive parameter memory bank and the previously inactive state memory bank, which contain the revised stream forming data and the new state variables respectively, becomes the active memory banks. The generation of test traffic then continues at 825 using the revised stream forming data and the new state variables. Note that the action of selectively resetting state variables (760 in the process 700) is not present in the process 800 since the state variables are all reset by switching the state memory banks.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A traffic generator to generate packets for testing a network under test, comprising:
   a first parameter memory bank, the first parameter memory bank active when a first bank select data has a first value and inactive when the first bank select data has a second value;
   a second parameter memory bank, the second parameter memory bank inactive when the first bank select data has the first value and active when the first bank select data has the second value;
   one or more engines to generate packets based on parameters stored in the active one of the first and second parameter memory banks; and
   a processor coupled to the first and second parameter memory banks and configured to write updated parameter data into the inactive one of the first and second parameter memory banks, wherein
   the one or more engines store one or more state variables in a state memory, and
   at least some of the state variables are reset to respective predetermined values when the first bank select data changes between the first value and the second value.

2. The traffic generator of claim 1, wherein the parameters stored in the active one of the first and second parameter memory banks include flags associated with at least some of the state values, each flag indicating whether or not the associated state variable is reset to a respective predetermined value when the first bank select data changes between the first value and the second value.

3. The traffic generator of claim 1, wherein the parameters stored in the active one of the first and second parameter memory banks include flags and respective predetermined values associated with at least some of the state variables, each flag indicating whether or not the associated state variable is reset to the respective predetermined value when the first bank select data changes between the first value and the second value.

4. The traffic generator of claim 1, wherein
   the state memory is partitioned into
      a first state memory bank, the first state memory bank active when a second bank select data has the first value and inactive when the second bank select data has the second value, and
      a second state memory bank, the second state memory bank inactive when the second bank select data has the first value and active when the second bank select data has the second value; and the processor is coupled to the first and second state memory banks and configured to write state variables into the inactive one of the first and second state memory banks.

5. The traffic generator of claim 1, wherein
the traffic generator is one of a plurality of traffic generators generating traffic to the network under test, and
the first bank select data is provided to all of the plurality of traffic generators.

6. The traffic generator of claim 1, further comprising:
a third parameter memory bank which is always active,
the one or more engines further to generate packets based on parameters stored in the third parameter memory bank.

7. The traffic generator of claim 6, wherein the first, second, and third parameter memory banks are reconfigurable partitions of a parameter memory.

8. The traffic generator of claim 7, further comprising:
a memory bank configuration map to store data indicating how the parameter memory is partitioned into the first, second, and third parameter memory banks.

9. A method for generating traffic to test a network under test, comprising:
selecting a first parameter memory bank to be active and a second parameter memory bank to be inactive when first bank select data has a first value and selecting the first parameter memory bank to be inactive and the second parameter memory bank to be active when first bank select data has a second value;
storing one or more state variables in a state memory;
resetting at least some of the one or more state variables to respective predetermined values when the first bank select data changes between the first value and the second value;
generating packets based on parameters stored in the active one of the first and second parameter memory banks and the one or more state variables; and
writing parameter data into the inactive one of the first and second parameter memory banks.

10. The method of claim 9, wherein the parameters stored in the active one of the first and second parameter memory banks include flags associated with at least some of the state values, each flag indicating whether or not the associated state variable is reset to a respective predetermined value when the first bank select data changes between the first value and the second value.

11. The method of claim 9, wherein the parameters stored in the active one of the first and second parameter memory banks include flags and respective predetermined values associated with at least some of the state variables, each flag indicating whether or not the associated state variable is reset to the respective predetermined value when the first bank select data changes between the first value and the second value.

12. The method of claim 9, wherein
the state memory is partitioned into
a first state memory bank, the first state memory bank active when second bank select data has the first value and inactive when the second bank select data has the second value, and
a second state memory bank, the second state memory bank inactive when the second bank select data has the first value and active when the second bank select data has the second value; and
the method further comprises writing state variables into the inactive one of the first and second state memory banks.

13. The method of claim 9, wherein
generating packets further comprises a plurality of traffic generators generating packets for transmission over the network under test, and
the method further comprises providing the same first bank select data to all of the plurality of traffic generators.

14. The method of claim 9, further comprising:
generating packets based on parameters stored a third parameter memory bank which is always active.

15. The method of claim 14, further comprising:
partitioning a parameter memory into the first, second, and third parameter memory banks.

16. The method of claim 15, wherein partitioning the parameter memory further comprises:
storing, in a memory bank configuration map, data indicating how the parameter memory is partitioned into the first, second, and third parameter memory banks.

17. A computer readable storage medium storing program code which, when used to configure a one or more programmable devices, causes the programmable devices to include a traffic generator comprising:
a first parameter memory bank, the first parameter memory bank active when a first bank select data has a first value and inactive when the first bank select data has a second value;
a second parameter memory bank, the second parameter memory bank inactive when the first bank select data has the first value and active when the first bank select data has the second value;
one or more engines to generate packets based on parameters stored in the active one of the first and second parameter memory banks; and
a processor coupled to the first and second parameter memory banks and configured to write updated parameter data into the inactive one of the first and second parameter memory banks, wherein
the one or more engines store one or more state variables in a state memory, and
at least some of the state variables are reset to respective predetermined values when the first bank select data changes between the first value and the second value.

18. The computer readable storage medium of claim 17, wherein the parameters stored in the active one of the first and second parameter memory banks include flags associated with at least some of the state values, each flag indicating whether or not the associated state variable is reset to a respective predetermined value when the first bank select data changes between the first value and the second value.

19. The computer readable storage medium of claim 17, wherein the parameters stored in the active one of the first and second parameter memory banks include flags and respective predetermined values associated with at least some of the state variables, each flag indicating whether or not the associated state variable is reset to the respective predetermined value when the first bank select data changes between the first value and the second value.

20. The computer readable storage medium of claim 17, wherein
the state memory is partitioned into
a first state memory bank, the first state memory bank active when a second bank select data has the first value and inactive when the second bank select data has the second value, and
a second state memory bank, the second state memory bank inactive when the second bank select data has the first value and active when the second bank select data has the second value; and the processor is coupled to the first and second state memory banks and configured to write state variables into the inactive one of the first and second state memory banks.

21. The computer readable storage medium of claim 17, the traffic generator further comprising:

a third parameter memory bank which is always active, the one or more engines further to generate packets based on parameters stored in the third parameter memory bank.

22. The computer readable storage medium of claim 21, wherein the first, second, and third parameter memory banks are reconfigurable partitions of a parameter memory.

23. The computer readable storage medium of claim 22, the traffic generator further comprising:

a memory bank configuration map to store data indicating how the parameter memory is partitioned into the first, second, and third parameter memory banks.

24. A computer readable storage medium storing program code which, when executed by a computing device, causes the computing device to perform a method for generating traffic, comprising:

selecting a first parameter memory bank to be active and a second parameter memory bank to be inactive when first bank select data has a first value and selecting the first parameter memory bank to be inactive and the second parameter memory bank to be active when first bank select data has a second value;

storing one or more state variables in a state memory;

resetting at least some of the one or more state variables to respective predetermined values when the first bank select data changes between the first value and the second value;

generating packets based on parameters stored in the active one of the first and second parameter memory banks and the one or more state variables; and writing parameter data into the inactive one of the first and second parameter memory banks.

25. The computer readable storage medium of claim 24, wherein the parameters stored in the active one of the first and second parameter memory banks include flags associated with at least some of the state values, each flag indicating whether or not the associated state variable is reset to a respective predetermined value when the first bank select data changes between the first value and the second value.

26. The computer readable storage medium of claim 24, wherein the parameters stored in the active one of the first and second parameter memory banks include flags and respective predetermined values associated with at least some of the state variables, each flag indicating whether or not the associated state variable is reset to the respective predetermined value when the first bank select data changes between the first value and the second value.

27. The computer readable storage medium of claim 24, wherein the state memory is partitioned into a first state memory bank, the first state memory bank active when a second bank select data has the first value and inactive when the second bank select data has the second value, and a second state memory bank, the second state memory bank inactive when the second bank select data has the first value and active when the second bank select data has the second value; and the method for generating traffic further comprises writing state variables into the inactive one of the first and second state memory banks.

28. The computer readable storage medium of claim 24, method for generating traffic further comprising:

generating packets based on parameters stored a third parameter memory bank which is always active.

29. The computer readable storage medium of claim 28, method for generating traffic further comprising:

partitioning a parameter memory into the first, second, and third parameter memory banks.

30. The computer readable storage medium of claim 29, wherein partitioning the parameter memory further comprises:

storing, in a memory bank configuration map, data indicating how the parameter memory is partitioned into the first, second, and third parameter memory banks.

* * * * *